Jan. 16, 1968 R. A. PALMER 3,363,438
CONTROL SYSTEM HAVING MANUALLY MOVABLE SELECTOR
MEANS AND PARTS THEREFOR OR THE LIKE
Filed Dec. 28, 1966 5 Sheets-Sheet 1

INVENTOR.
REED A. PALMER

BY

Candor & Candor

HIS ATTORNEYS

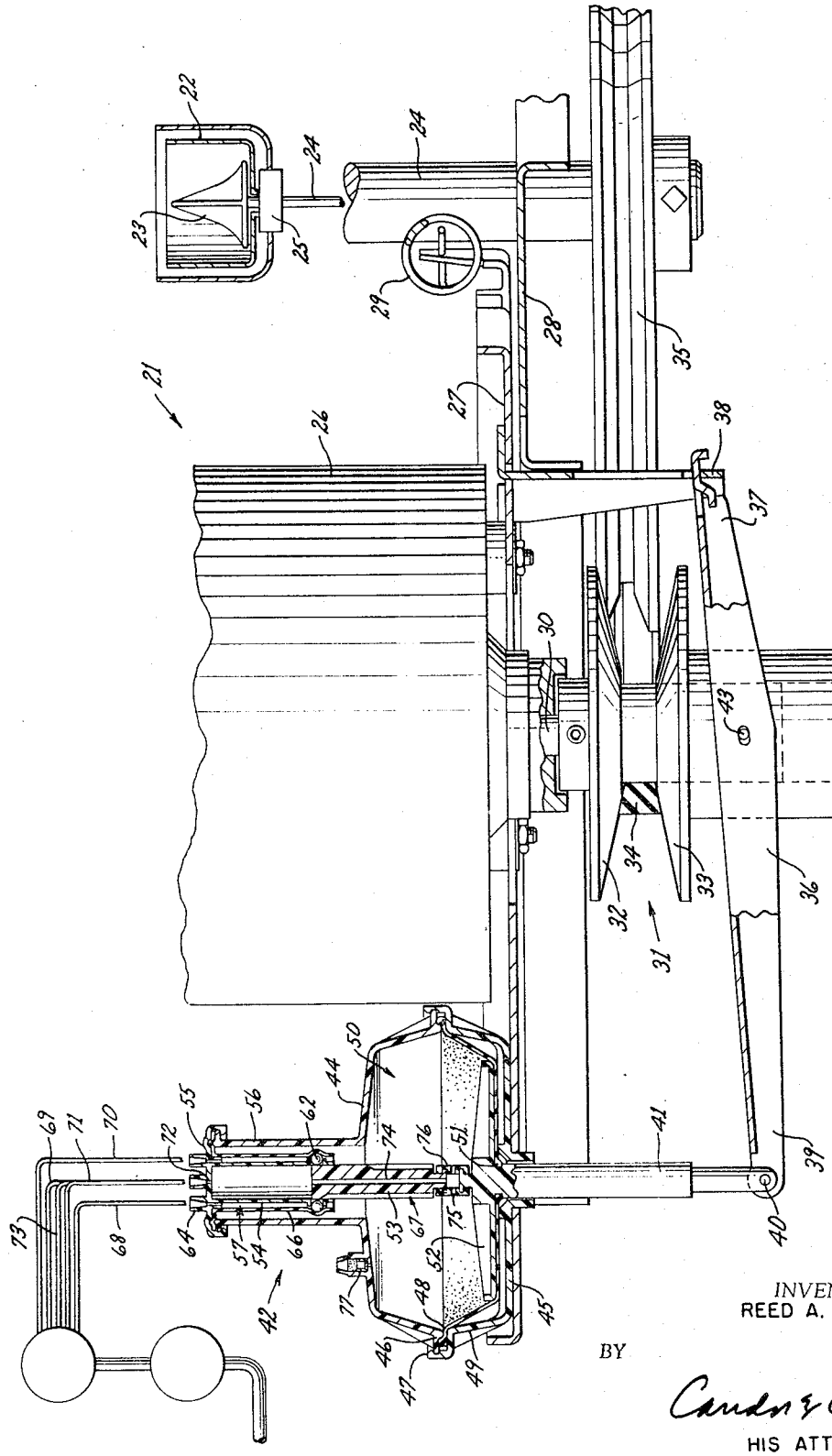

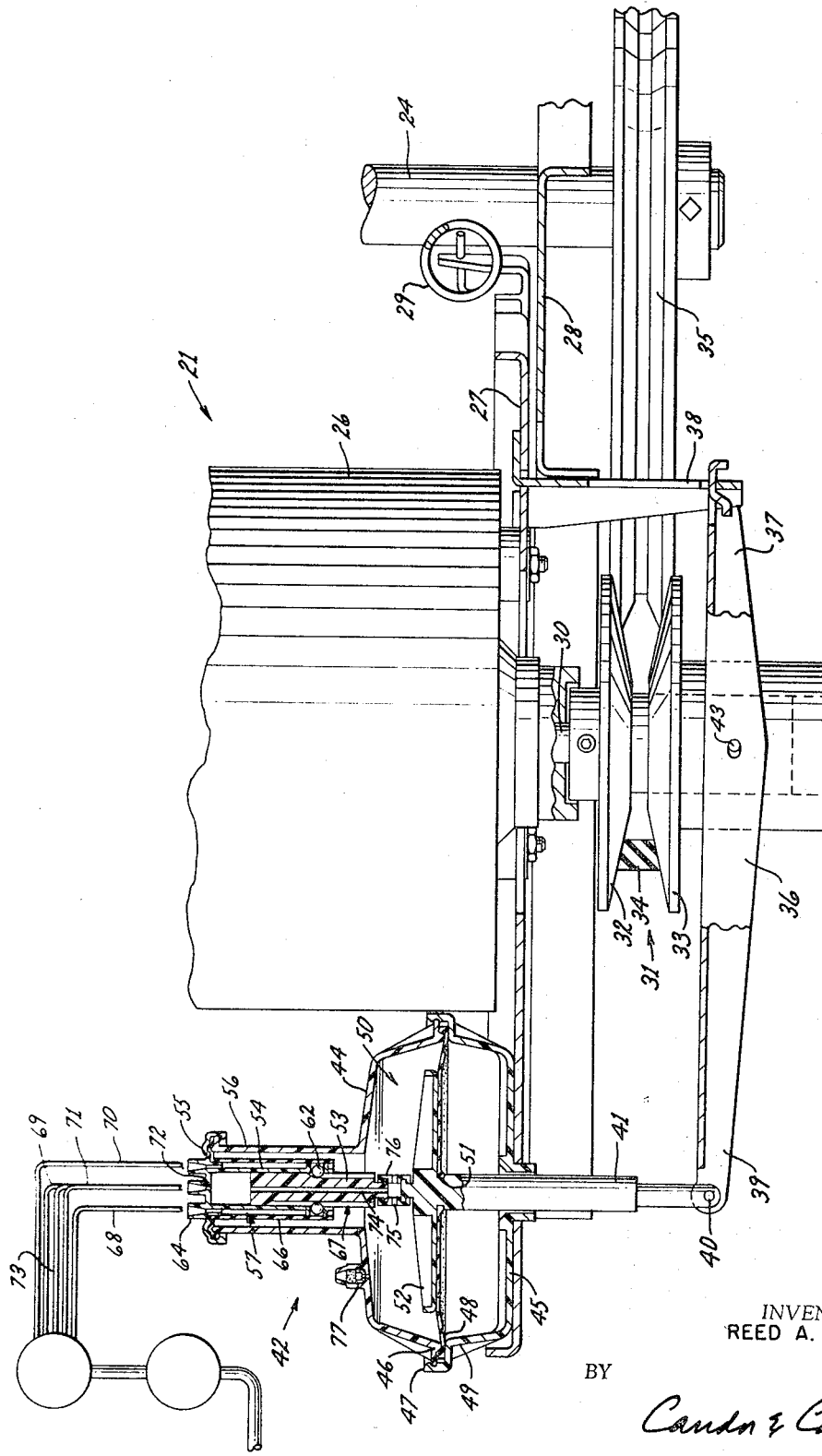

Jan. 16, 1968 R. A. PALMER 3,363,438
CONTROL SYSTEM HAVING MANUALLY MOVABLE SELECTOR
MEANS AND PARTS THEREFOR OR THE LIKE
Filed Dec. 28, 1966 5 Sheets-Sheet 5

INVENTOR.
REED A. PALMER

BY Candor & Candor

HIS ATTORNEYS

United States Patent Office 3,363,438
Patented Jan. 16, 1968

3,363,438
CONTROL SYSTEM HAVING MANUALLY MOVABLE SELECTOR MEANS AND PARTS THEREFOR OR THE LIKE
Reed A. Palmer, Greensburg, Pa., assignor to Robertshaw Controls Company, Richmond, Va., a corporation of Delaware
Filed Dec. 28, 1966, Ser. No. 605,492
25 Claims. (Cl. 68—12)

ABSTRACT OF THE DISCLOSURE

This disclosure relates to manually movable selector means for actuating a multi-step actuator means to various positions thereof to vary the operating function of a device in relation to the stepped positions of the actuator means, the selector means being so constructed and arranged that the selector means can be manually movable and infinitely settable between a first predetermined set position thereof and a last predetermined set position thereof and will actuate the actuator means to an operating stepped position thereof in any manually set position of said selector means even though the selector means is medially set between adjacent predetermined indicated set positions thereof.

---

This invention relates to improved manually movable selector means for controlling the operation of an apparatus control system or the like as well as to improved parts for such a control system or the like.

It is well known that domestic washing machines and the like are provided with control systems wherein the housewife or the like can manually select the speed of spin of the washing compartment thereof during a centrifuging operation and/or the speed of movement of an agitator means thereof during the wash and/or rinse cycles.

Such speed control means are relatively expensive and complicated when the same are made to be infinitely variable between the high and low settings thereof.

Therefore, it has been found according to the teachings of this invention that the speed control means can be varied in a relatively large number of stepped increments producing substantially the same function as an infinitely variable speed control means without the adverse cost and complicated structure required for such infinitely variable speed control means.

However, it was also found that in order to provide manual selection of such multi-stepping speed control means, some means must be provided to produce substantially the desired speed selected even though the housewife or the like accidentally did not set the selector means at an exact set point for a particular speed setting.

Further, it was found that while the improved selector means of this invention solved the above problem in a manner hereinafter set forth, the selector means of this invention solved the above problem in a manner hereinafter set forth, the selector means of this invention inherently conveyed the impression to the housewife or the like of an infinitely variable control means for the apparatus because the selector means has an infinite "feel" during the manual setting thereof.

Accordingly, one of the features of this invention is to provide a selector means for an apparatus control system wherein the selector means is adapted to actuate a multi-step actuator means to a particular step position thereof for an intended purpose while also actuating the actuator means to an operating stepped position thereof in any manually set position of the selector means even though the selector means is set between adjacent predetermined set positions thereof.

Accordingly, it is an object of this invention to provide an improved control system having one or more of the novel features set forth above or hereinafter shown or described.

Another object of this invention is to provide an improved part or parts for such a control system or the like.

Other objects, uses and advantages of this invention are apparent from a reading of this description which proceeds with reference to the accompanying drawings forming a part thereof and wherein:

FIGURE 2 is a schematic, fragmentary cross-sectional view illustrating part of the apparatus utilizing the control system of FIGURE 1.

FIGURE 3 is a view similar to FIGURE 2 and illustrates the apparatus in another operating position thereof.

Figure 1:
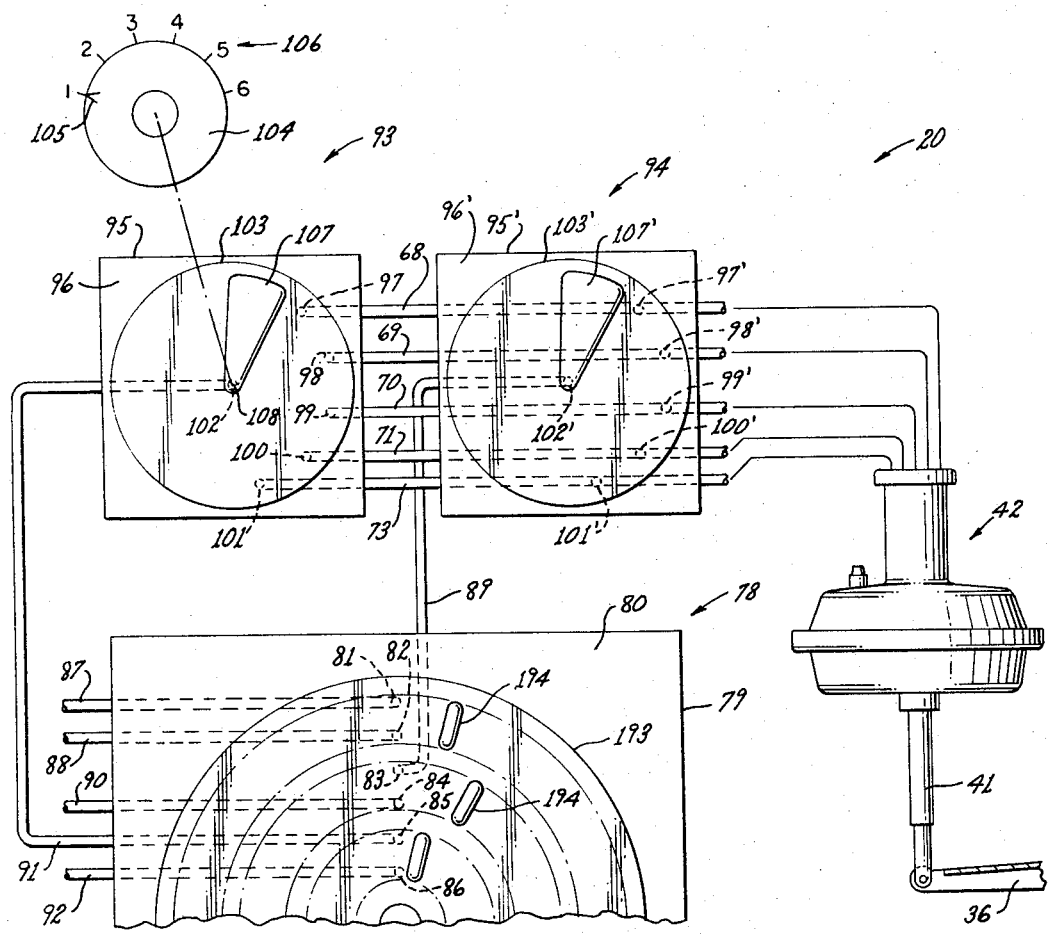
FIGURE 1 is a schematic view illustrating one embodiment of the improved control system of this invention.

While the various features of this invention are hereinafter described and illustrated as being particularly adaptable for providing a control system having manually movable selector means for controlling the speed of spin and/or agitation of a washing machine or the like, it is to be understood that the various features of this invention can be utilized singly or in any combination thereof to provide a control system and/or selector means for other types of apparatus as desired.

Therefore, this invention is not to be limited to only the embodiments illustrated in the drawings, because the drawings are merely utilized to illustrate one of the wide variety of uses of this invention.

Referring now to FIGURE 1, the improved control system of this invention is merely indicated by the reference numeral 20, the control system 20 of FIGURE 1 being utilized to control the operation of a domestic washing machine or the like generally indicated by the reference numeral 21 in FIGURE 2.

The laundry apparatus 21 of FIGURE 2 includes a washing compartment means 22 adapted to receive laundry therein, the washing compartment 22 having a conventional agitator means 23 disposed therein. The agitator means 23 is adapted to be moved for agitation purposes when the input shaft 24 of a transmission means 25 is rotated in one direction by a conventional, reversible electrical motor 26 and the washing compartment 22 is adapted to be rotated or spun when the input shaft 24 of the transmission means 25 is rotated in the other direction by the reversible motor 26.

In particular, the electrical motor 26 is mounted to a movable frame member 27 pivotally mounted to a stationary frame member 28 of the apparatus 21 with the movable frame member 27 normally being held in the pivoted position illustrated in FIGURE 2 by a suitable tension spring means 29. The motor 26 has an output shaft means 30 carrying a variable pitch pulley means 31 comprising a fixed sheave 32 and a movable sheave 33. A continuous belt 34 passes around part of the variable pitch pulley means 31 and around a fixed pulley 35 carried on the input shaft 24 of the transmission means 25.

In this manner, when the output shaft means 30 of the motor 26 is being rotated in a particular direction, the belt 34 drives the fixed pulley 35 and, thus, rotates the input shaft 24 of the transmission means 25 in a particular direction.

When the sheave 33 is in its farthest position from the fixed sheave 32, it can be seen that the output shaft means 30 of the motor 26 will drive the input shaft 24 of the transmission means 25 at its lowest speed. However, as the movable sheave 33 is moved closer and closer to the fixed sheave 32 in a manner hereinafter described, the effective diameter of the pulley 31 correspondingly increases and causes a corresponding increase in the speed of rotation of the input shaft 24 of the transmission means 25 whereby the positioning of the sheave 33 relative to the sheave 32 will control the speed of spin of the washing compartment 22 and the speed of movement of the agitator means 23.

In order to vary the position of the movable sheave 33 relative to the fixed sheave 32 of the variable pitch pulley means 31, a lever 36 has one end 37 pivotally mounted to an arm 38 of the movable frame member 27 and the other end 39 pivotally mounted by a pivot pin 40 to an actuating post 41 of a multi-step, pneumatically operated actuator means 42 controlled in a manner hereinafter set forth. The lever 36 is interconnected to the variable sheave 33 intermediate the lever ends 37 and 39 by a pin means 43 so that pivotal movement of the lever 36 in the manner illustrated in FIGURES 2 and 3 will control the effective speed of the rotation of the input shaft 24 of the transmission means 25 for the purposes previously set forth, the frame 27 pivoting relative to the frame 28 to compensate for the increase and the decrease in the effective diameter of the pulley means 31 as the belt means 34 rides outwardly and inwardly relative to the motor shaft 30.

The multi-step or multi-position actuator means 42 comprises a pair of substantially cup-shaped housing members 44 and 45 snap fitted together at their respective open ends 46 and 47 to not only hold the housing members 44 and 45 together, but also to clamp and hold an outer peripheral means 48 of a flexible diaphragm means 49 therebetween whereby the flexible diaphragm 49 cooperates with the cup-shaped housing member 44 to define a chamber 50 therebetween.

The flexible diaphragm 49 has its inner peripheral means 51 secured to the actuating post 41 with the actuating post 41 having a diaphragm back-up plate portion 52 disposed within the chamber 50 and abutting against the inner side of the diaphragm 49 as illustrated. The plate portion 52 of the actuating post 41 is interconnected to a cam track member 53 so that the member 53 will move in unison with the flexible diaphragm 49 in a manner hereinafter set forth. The cam track member 53 is axially movable in a tubular member 54 extending inwardly from an end wall plate means 55 closing off an outwardly extending tubular extension 56 of the housing member 44.

Figure 4:
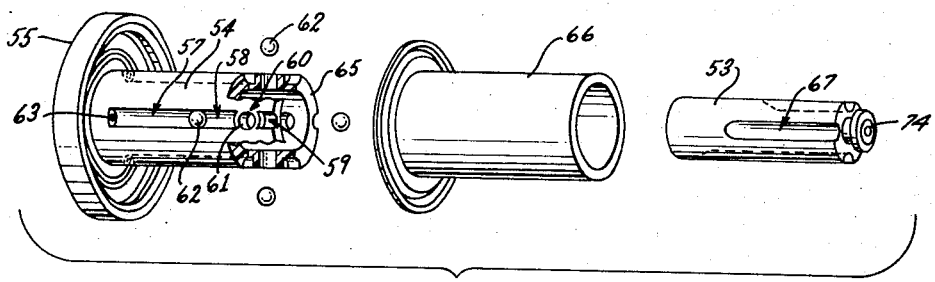
FIGURE 4 is an exploded perspective view, partially broken away, illustrating certain parts of the multi-step actuator means of FIGURE 2.

As illustrated in FIGURE 4, the telescoping tubular part 54 of the end plate 55 has a plurality of channel means 57 formed in the exterior surface thereof and aligned with the longitudinal axis of the member 54, each channel means 57 having a left-hand portion 58 separated from a right-hand portion 59 thereof by an uninterrupted surface area 60 of the member 54. Each area 60 has an aperture 61 passing radially therethrough and receiving a ball 62 for a purpose hereinafter described. The left-hand portion 58 of each channel means 57 is disposed in fluid communication with a passage means 63 passing through the end wall 55 of the actuator 42 and being in fluid communication with an outwardly extending nipple or coupling 64 for a purpose hereinafter described. The right-hand portion 59 of each channel means 57 interrupts the flat end surface 65 of the tubular member 54 to be disposed in fluid communication with the chamber 50 of the actuator means 42.

A flexible tubular member 66 is telescoped over the member 54 in the manner illustrated in FIGURES 2 and 4 and cooperates with the cam track means 53 in a manner now to be described.

Figure 5:
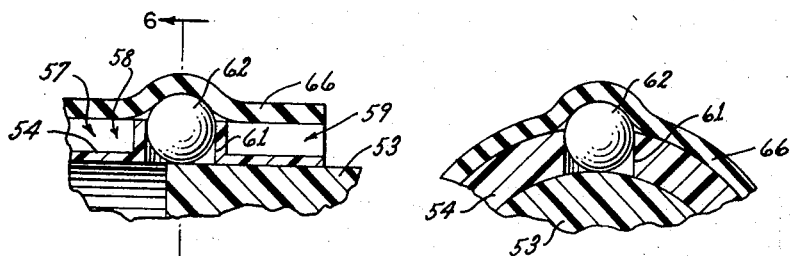
FIGURE 5 is an enlarged, fragmentary, cross-sectional view of part of the actuator illustrated in FIGURE 2.
Figure 6:
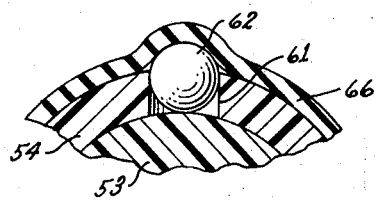
FIGURE 6 is a fragmentary cross-sectional view taken on line 6—6 of FIGURE 5.
Figure 7:
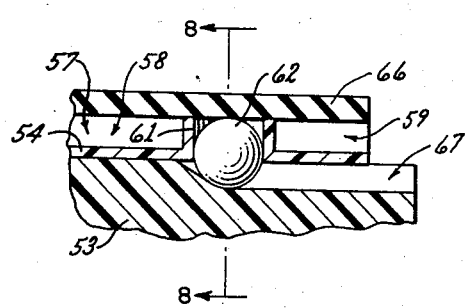
FIGURE 7 is a view similar to FIGURE 5 and illustrates part of the actuator in the position illustrated in FIGURE 3.
Figure 8:
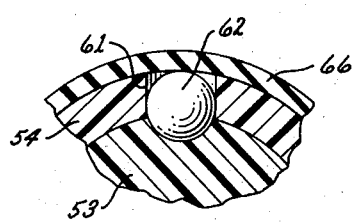
FIGURE 8 is a fragmentary cross-sectional view taken on line 8—8 of FIGURE 7.

As illustrated in FIGURE 4, the substantially cylindrical cam track member 53 has its exterior surface interrupted by a plurality of grooves 67 alignable with the apertures 61 passing through the member 54 and being of a size to receive their respective balls 62. When a particular groove 67 of the cam track means 53 receives its respective ball 62 therein in the manner illustrated in FIGURES 7 and 8, it can be seen that the outer tubular sealing member 66 completely seals closed the left-hand part 58 of the passage or channel means 57 from the right-hand end 59 thereof at the respective area 60 whereas the ungrooved portion of the member 53 will cam its respective ball 62 upwardly in the manner illustrated in FIGURES 5 and 6, the cammed ball 62 urging the flexible member 66 upwardly away from sealed relation with the respective area 60 in such a manner that fluid communication will be created between the left-hand portion 58 and right-hand portion 59 of the respective channel means 57 for a purpose hereinafter described.

Thus, it can be seen that the actuator 42 has four such passage means or channels 57 sealed from each other by the flexible tubular member 66 and individually operated by the cam track means 53 in a manner hereinafter described, such channel members 57 being respectively fluidly interconnected to flexible conduit means 68, 69, 70 and 71 respectively press-fitted over or otherwise disposed in fluid communication with the respective nipples 64 on the end plate 55.

In addition, the interior of the inner tubular member 54 is disposed in fluid communication with a passage means 72 passing through the end plate 55 and interconnected by its corresponding nipple 64 to a flexible conduit 73, the interior of the member 54 also being interconnected to the chamber 50 by a passage means 74 passing through the cam track member 53 and passage means 75 passing through a member 76 that interconnects the cam track member 53 to the back-up plate portion 52 of the actuating post 41.

The chamber 50 of the actuator 42 is adapted to be interconnected to the atmosphere at a controlled rate by a fixed orifice member 77 for a purpose hereinafter described.

The control system 20 for the apparatus 21 is illustrated in FIGURE 1 and includes a main program means generally indicated the reference numeral 78 for automatically controlling the cycle of operation of the washing machine 21.

In particular, the program means 78 includes a reading head 79 having a flat reading surface 80 interrupted by a plurality of ports 81, 82, 83, 84, 85 and 86 respectively interconnected to flexible conduit means 87, 88, 89, 90, 91 and 92 on the rear side of the reading head 79. A flexible reading sheet or member 193 is adapted to be disposed against the reading surface 80 and be rotated relative thereto by a suitable time motor (not shown), the reading sheet 193 having a plurality of raised blisters 194 formed therein to define channels in the under side of the member 193 facing the reading surface 80. Each channel or blister means 194 is adapted to bridge two or more ports in the reading head 79 when the particular blister means 194 is aligned therewith for a desired function.

For example, the flexible conduits 88, 90 and 92 can be interconnected to a pneumatic source, such as the inlet side of a vacuum pump (not shown) while the conduit 87 can be interconnected to the actuating chamber of a pneumatically operated actuator. Thus, when a blister 194 on the reading member 193 bridges the ports 81 and 82, the pneumatic source connected to the conduit 88 is now interconnected to the conduit 87 leading to the pneumatically operated actuator to move the actuator to an operating position thereof as long as blister means 194 bridge the ports 81 and 82.

Thus, it can be seen that by arranging the blister means 194 in a predetermined pattern on the reading sheet 193, the entire cycle of operation of the washing machine 21 can be controlled by the movement of the reading sheet 193 relative to the reading head 79 by a suitable timer motor or the like.

However, as previously set forth, one of the features of this invention is to provide selector means for permitting the housewife or the like to manually select the desired speed of spin of the washing compartment 22 and/or speed of movement of the agitator 23 by affecting the positioning of the movable sheave 33 of the variable sheave pulley means 31 relative to the fixed sheave 32 thereof.

Figure 9:
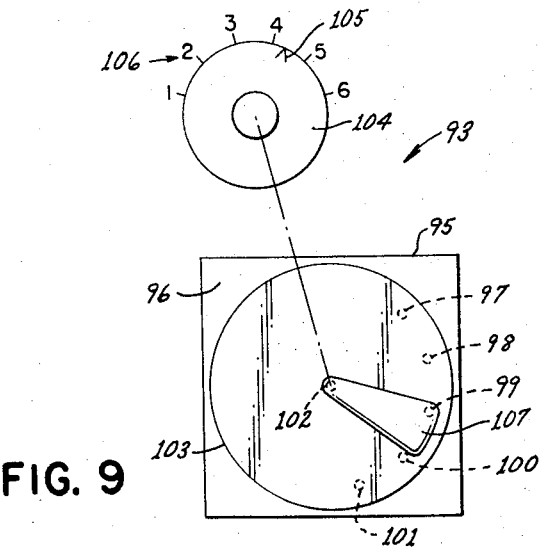
FIGURE 9 is a view of one of the selector means of FIGURE 1 disposed in another set position thereof.

Accordingly, one improved selector means of this invention is generally indicated by the reference numeral 93 in FIGURES 1 and 9 and is so constructed and arranged that the same in cooperation with the program means 78 permits the housewife to manually select the speed of movement of the agitator 23 while a companion selector means 94 permits the housewife or the like to manually select the speed of spin of the washing compartment 22. However, since the selector means 93 and 94 are identical except for their output functions as set forth above, only the selector means 93 will be described in detail with it being understood that the selector means 94 is constructed and operates in the same manner as the described selector means 93.

The selector means 93 comprises a reading head 95 having a flat reading surface 96 interrupted by a plurality of ports 97, 98, 99, 100 and 101 respectively fluidly connected to the flexible conduits 68, 69, 70, 71 and 73 leading to the nipple means 64 of the pneumatically operated multi-step actuator 42 previously described. In addition, the reading surface 96 of the reading head 95 is interrupted by a port 102 disposed in fluid communication with the flexible conduit 91 leading to the port 85 of the main reading head 79 previously described.

A flexible reading sheet or member 103 is disposed against the reading surface 96 of the reading head 95 and is adapted to be rotated relative thereto by a rotatable control knob 104 in any suitable manner with the rotatable control knob 104 having a suitable position indicator means 105 thereon adapted to indicate the rotational position of the reading sheet 103 relative to fixed markings 106 on a suitable control panel or the like.

The reading sheet 103 of the selector means 93 has a substantially triangular shaped blister or channel means 107 formed therein with the channel side facing the reading surface 96 of the reading head 95. The reading sheet 103 is so constructed and arranged that the area of the channel means 107 adjacent the apex 108 of the triangular shaped blister means 107 will always be disposed in fluid communication with the port 102 in any rotatable position of the reading sheet 103 relative to the reading head 95.

The channel means 107 of the reading sheet 103 is formed of a width sufficient to bridge each pair of two adjacent ports 97, 98; 98, 99; 99, 100 and 100, 101 when the blister member 107 is medially positioned between the respective pair of adjacent ports by the control knob 104 whereby in any set position of the control knob 104 between the first position thereof as indicated by the marking "1" and the last position thereof indicated by the marking "6" the blister 107 will always be in communication with one or more of the ports 97–101 except at and adjacent the first predetermined set position of the control knob 104 as illustrated in FIGURE 1.

Therefore, since the blister 107 is always in communication with the vacuum source conduit 91 and will always be in communication with one of the ports 97–101 with the exception set forth above, the selector means 93 will always interconnect the vacuum source to the pneumatically operated actuator means 42 when the blister means 194 of the main reading sheet 193 bridges the ports 85 and 86 and the housewife or the like has set the control knob 104 in a position anywhere between "1½" setting and the last setting "6."

In this manner, should the housewife or the like fail to actually position the indicator means 105 of the control knob 104 on one of the predetermined set speed settings "1–6," the actuator 42 will be functioning to set the speed of the transmission means 25 at a speed closest to the nearest predetermined set indication 106 so that the housewife, in effect, has an infinite variable "feel" when adjusting the control knob 104 for speed selection.

In particular, should the housewife or the like desire to set the speed of agitation at a speed corresponding to the indicated speed position "4" illustrated in FIGURE 9 and actually set the knob 104 in advance of the "4" position setting, it can be seen that the blister 107 is still bridging the port 99 in the reading head 95 with the vacuum source point port 102 when the program member 78 interconnects the ports 85 and 86 together whereby the vacuum source will be interconnected to the conduit 70 leading to a particular channel means 57 of the actuator 42. Since the actuator 42 is normally held in a slow speed setting thereof by the tension spring 29, the channel means 57 interconnected to the conduit 70 has its corresponding ball 62 cammed radially outwardly by the cam track member 53 in the manner illustrated in FIGURE 2 so that the source of vacuum connected to the conduit 70 by means of the selector means 93 and main program means 78 will be interconnected to the chamber 50 of the actuator 42 to begin to evacuate the same. As the chamber 50 is being evacuated, the diaphragm 49 is drawn upwardly by the pressure differential across the same in opposition to the tension spring 29 until the diaphragm reaches the position illustrated in FIGURE 3 where the particular groove 67 of the cam track member 53 permits the ball 62 to move radially inwardly and have the sealing member 66 close off the illustrated right-hand passage means 57 that is interconnected to the conduit 70 so that further evacuation of the chamber 50 cannot take place at this particular setting of the selector knob 104.

It can be seen that when the actuator 42 is actuated to the stepped position illustrated in FIGURE 3, the lever 36 has been pivoted about its end 37 in a clockwise direction to move the movable sheave 33 of the variable pitch pulley means 31 toward the fixed sheave 32 to increase the effective diameter of the pulley means 31 to drive the input shaft 24 of the transmission means 25 at a speed corresponding to the predetermined set speed setting "4" of FIGURE 9 even though the control knob 104 isn't positively set at the "4" position.

Thus, the actuator 42 will remain in the position illustrated in FIGURE 3 until the source of vacuum is disconnected from the conduit means 70 by the program member 93 whereby atmosphere is adapted to return to the chamber 50 at a controlled rate through the fixed orifice 77 whereby the flexible diaphragm 49 will return to the position illustrated in FIGURE 2 under the force of the tension spring 29 until the chamber 50 is again evacuated in substantially the same manner as set forth above.

Accordingly, it can be seen that the actuator 42 has six actuating positions, the first position being the position illustrated in FIGURE 2 wherein the chamber 50 is at an atmospheric condition and the other five stepped positions being controlled and set by the cam track means 53 in relation to the particular conduit means 68, 69, 70, 71 and 73 being interconnected to the vacuum source by the selector means 93.

Thus, the vacuum source is adapted to be connected to the chamber 50 of the actuator 42 by the selector means 93 when the control knob 104 is set at and adjacent the "1" position thereof until the knob 104 is set in a medial position between the "1" and "2" positions whereby the blister 107 will bridge the port 102 with the port 97. The blister 107 will bridge the vacuum port 102 with the port 97 in any set position of the selector knob 104 between a "1½" setting and almost a "2½" setting thereof. At the "2½" setting of the control knob 104, the blister 107 will be bridging the port 102 with the ports 97 and 98 whereby the passage means 57 of the actuator 42 interconnected to the conduit 69, will be the controlling passage means setting the diaphragm 49 in its particular actuated position.

Accordingly, regardless of the actual setting of the control knob 104 of the selector means 93 between the "1½" setting and the last setting "6" thereof, the actuator 42 will be actuated to an actuated stepped position substantially corresponding to the closest predetermined set position of the selector means 93 with the increment of changes between the various steps of the actuator 42 being relatively small so that in effect, an infinite variable speed control means is provided and utilizes a selector means 93 having an infinitely variable "feel" for the reasons previously set forth.

While the selector means 93 has been described as controlling the speed of movement of the agitator 23, it can be seen that the selector means 94 will control the speed of spin of the washing compartment 22 when a blister means 194 of the main program means 78 bridges the ports 83 and 84 in the manner previously described whereby the parts of the selector means 94 identical to the selector means 93 previously described are indicated by like reference numerals followed by a prime mark.

While one form of selector means 93 or 94 of this invention has been previously described for permitting an infinite "feel" setting for a multi-step pneumatically operated actuator means 42, other selector means of this invention can be utilized in the same manner as the selector means 93 or 94 to produce such function.

Figure 10:
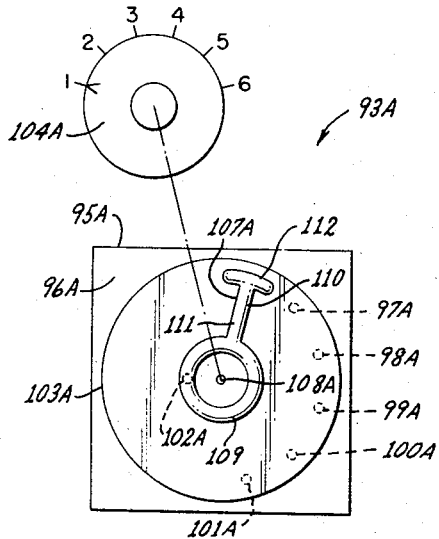
FIGURE 10 is a view similar to FIGURE 9 and illustrates another embodiment of the selector means of this invention.
Figure 11:
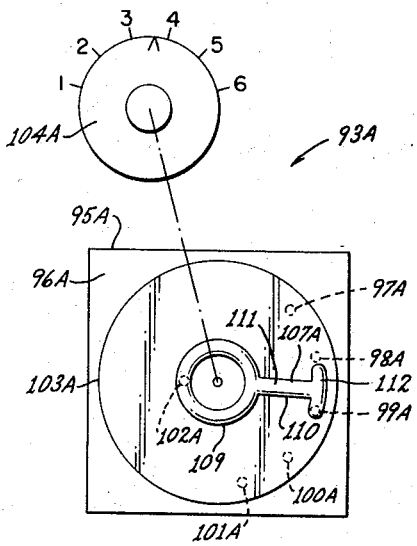
FIGURE 11 is a view similar to FIGURE 10 and illustrates the selector means of FIGURE 10 in another set position thereof.

For example, another embodiment of a manually movable selector means of this invention is generally indicated by the reference numeral 93A in FIGURES 10 and 11 and parts thereof similar to the selector means 93 previously described are indicated by like reference numerals followed by the reference letter "A."

As illustrated in FIGURES 10 and 11, the selector means 93A includes a reading head 95A having the flat reading surface 96A interrupted by the ports 97A, 98A, 99A, 100A, and 101A adapted to be fluidly connected to the flexible conduit 68, 69, 70, 71 and 73 of the multi-step actuator 42 previously described. In addition, the reading surface 96A is interrupted by a port 102A adapted to be interconnected to the flexible conduit 91 leading to the main program means 78.

The selector means 93A includes the previously described selector knob means 104A for rotating a flexible reading sheet 103A relative to the reading head 95A for the purposes previously described. However, the blister means 107A formed in the reading sheet 103A is substantially different in configuration than the triangular shaped blister means 107 previously described but produces the same function for the reasons previously set forth.

In particular, the blister 107A has a ring-like portion 109 concentrically disposed about the axis 108 of rotation of the reading sheet or member 103A with the ring-like portion 109 being so constructed and arranged that the same is always in fluid communication with or superimposed over the vacuum source port 102A in any settable position of the control knob 104A. In addition, the blister means 107A has a substantially T-shaped portion 110 having the free end of the leg 111 thereof disposed in fluid communication with the ring-like portion 109 and having the cross member 112 thereof so constructed and arranged the same is adapted to bridge each pair of adjacent ports 97A, 98A; 98A, 99A; 99A, 100A and 100A and 101A when the cross member 112 is substantially medially disposed between the respective pair of adjacent ports in the same manner as previously described for the blister means 107 of the selector means 93.

Therefore, it can be seen that the selector means 93A functions in the same manner as the selector means 93 previously described while having the blister means 107A thereof formed in a different configuration than the blister means 107 previously described.

While the actuator means 42 previously described has six settable positions thereof, it may be found it is desired to have more selectable speed control positions for the transmissoin means 25 while still utilizing the features of this invention and the actuator means 42.

For example, the reversible motor 26 can be so constructed and arranged that the same has two speeds for the output shaft 30 thereof regardless of the direction of rotation of the output shaft 30. If so, the previously described selector means 93A of this invention can be modified to control such two speed reversible motor means 26 in a simple and effective manner.

Figures 12, 14, 15:
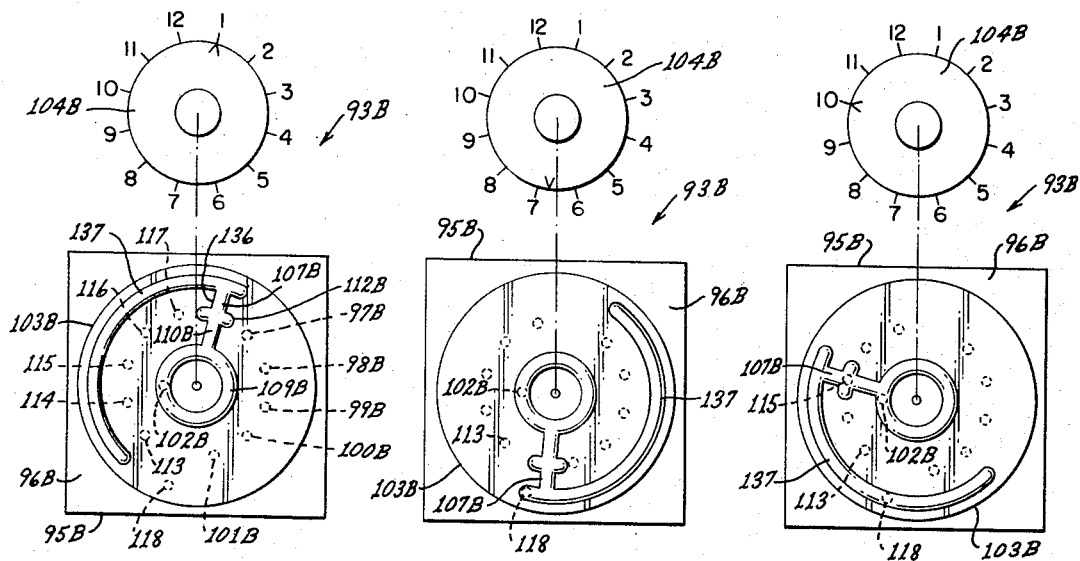
FIGURE 12 is a view similar to FIGURE 10 and illustrates another embodiment of the selector means of this invention.
FIGURE 14 is a view similar to FIGURE 12 and illustrates the selector means in another set position thereof.
FIGURE 15 is a view similar to FIGURE 12 and illustrates the selector means in still another set position thereof.

For example, such modified selector means is generally indicated by the reference numeral 93B in FIGURES 12, 14 and 15 wherein parts of the selector means 93B similarly to the selector means 93A are indicated by like reference numerals followed by the reference letter "B."

As illustrated in FIGURE 12, the selector means 93B is substantially identical to the selector means 93A of FIGURE 10 except that in addition to the previously described ports 97B–101B and the vacuum source port 102B formed in the reading head 95B, the reading surface 96B of the reading head 95B is interrupted by the ports 113, 114, 115, 116 and 117 adapted to be respectively connected to the conduits 68, 69, 70, 71 and 73 of the actuator 42 in the same manner that the ports 79B–101B are respectively interconnected to the conduits 68, 69, 70, 71 and 73. In addition, an outside port 118 interrupts the reading surface 96B of the reading head 95A and is adapted to be interconnected by a flexible conduit 119 to a pneumatically operated actuated means 120 illustrated in FIGURE 13.

Figure 13:
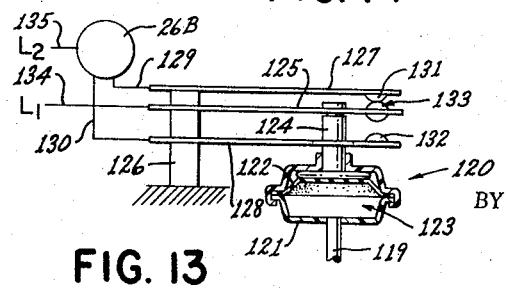
FIGURE 13 is a schematic view illustrating part of the control system controlled by the selector means of FIGURE 12.

The actuator 120 in FIGURE 13 includes a fixed housing member 121 cooperating with a flexible diaphragm 122 to define a chamber 123 therebetween, the diaphragm 122 carrying an actuating post 124 connected to a spring switch blade 125 having its left-hand end fixed to a terminal post means 126. The terminal post means 126 also carries a pair of switch blades 127 and 128 respectively interconnected to leads 129 and 130 leading to the electrical motor 26B. The swtich blades 127 and 128 respectively carry electrical contacts 131 and 132 on the free right-hand ends thereof adapted to cooperate with contact means 133 carried on the right-hand free end of the movable switch blade 125.

Thus, when the chamber 123 of the actuator 120 is at an atmospheric condition, the natural resiliency of the switch blade 125 holds its contact 133 in electrical contact with the contact 131 and since the switch blade 125 is interconnected to a power source lead $L^1$ by a lead 134 and since the other side of the electrical motor 26B is interconnected to the other power source lead L² by a lead 135, the power source lead L¹ is electrically connected to the motor 26B by the lead 129 so that the motor 26B will operate at its low speed setting in a manner well known in the art. However, when the chamber 123 of the actuator 120 is evacuated in a manner hereinafter described, the flexible diaphragm 122 is pulled downwardly to break the electrical contact between the contacts 133 and 131 by placing the contact 133 in electrical contact with the contact 132 so that the power source lead L¹ is now interconnected to the motor 26B by the lead 130 to operate the motor 26B at its high speed setting in a manner well known in the art.

The blister means 107B of the reading sheet 103B of the selector means 93B has the previously described ring-like portion 109B to always be disposed in fluid communication with the vacuum source port 102B in any settable position of the control knob 104B. In addition, the blister means 107B has the previously described T-shaped portion 110B whereby the cross member 112B not only cooperates with the ports 97B–110B in the same manner as the cross member 112 previously described but also the cross member 112B cooperates with the additional ports 113–117 in the same manner as hereinafter described.

The blister means 107B also includes an extension portion 136 radiating from the cross member 112B and being disposed in fluid communication therewith as well as with an arcuate outer portion 137 adapted to cooperate with port 118 in a manner now to be described.

As long as the selector knob 104B is set between the "1" and "6" settings thereof, the motor means 26B will be operating at its slow speed position because the chamber 123 of the actuator 120 is at its atmosperic condition as illustrated in FIGURE 13. However, when the selector knob 104B is set at a position of "6½" or above as illustrated in FIGURES 14 and 15, the arcuate portion 137 of the blister 107B fluidly interconnects the vacuum source port 102B with the port 118 leading to the actuator 120 to evacuate the same and move the switch blade 125 into electrical contact with the switch blade 128 so that the electrical motor 26B will now be operating at its high speed setting which produces a speed of the transmission means 25 one step above the speed of the transmission means 25 produced by the motor 26 operating at its low speed setting and with the actuator 42 in its maximum actuated position.

Thus, with the selector knob 104B set in the position illustrated in FIGURE 14, the motor 26B is operating at its highest speed setting with the actuator 42 being in its lowest stepped position as illustrated in FIGURE 2 until the T-shaped portion 102B fluidly interconnects the port 113 with the vacuum source port 102B to pull the flexible diaphragm 49 upwardly.

In this manner, it can be seen that the selector means 93B in combination with the two speed motor 26B and six position actuator 42 is adapted to permit the selection of twelve steps in the speed of operation of the transmission means 25 for the reasons previously set forth while still producing an infinitely variable "feel" selection means to the housewife or the like.

Therefore, it can be seen that this invention not only provides an improved control system for an apparatus or the like, but also this invention provides improved parts for such a control system or the like.

While the form of the invention now preferred has been disclosed as required by the statutes, other forms may be used, all coming within the scope of the claims which follow.

What is claimed is:

1. In a control system for an apparatus or the like wherein said system includes a multi-step actuator means for varying the operating function of a device of the apparatus in relation to the stepped position of said actuator means, the improvement comprising a manually movable selector means for actuating said actuator means to any one of said stepped positions thereof in relation to corresponding and predetermined set positions of said selector means, said selector means being so constructed and arranged that said selector means can be manually movable and infinitely settable between a first predetermined set positioned thereof and a last predetermined set position thereof and will actuate said actuator means to an operating stepped position thereof in any manually set position of said selector means even though said selector means is set between adjacent predetermined set positions thereof.

2. In a control system as set forth in claim 1, said actuator means being pneumatically operated, a pneumatic source, said selector means having means for interconnecting said pneumatic source to said actuator means in any set position of said selector means except at and adjacent said first predetermined set position thereof.

3. In a control system as set forth in claim 2, a program control means having means disposed between said source and said selector means for interconnecting and disconnecting said source to and from said selector means.

4. In a control system as set forth in claim 1, said apparatus comprising a laundry machine, said device comprising a speed control means for moving a movable part of said machine at a speed determined by the particular stepped position of said actuator means.

5. In a control system as set forth in claim 4, said movable part of said machine comprising a washing compartment for centrifuging said laundry disposed therein whereby said selector means selects the speed of spin of said washing compartment.

6. In a control system as set forth in claim 4, said movable part of said machine comprising an agitator means for agitating said laundry in said machine whereby said selector means selects the speed of movement of said agitator means.

7. In a control system as set forth in claim 1, said selector means includes a reading head having a reading surface interrupted by a plurality of ports, means for interconnecting certain of said ports to said actuator means, a pneumatic source, and means interconnecting said source to one of said ports, said selector means including a reading member movable relative to said reading surface and having means for fluidly interconnecting said one port to at least one of said certain ports at any set position of said selector means except at and adjacent said first predetermined set position thereof.

8. In a control system as set forth in claim 7, said interconnecting means of said reading member including a channel means in said reading member having its open side facing said reading surface.

9. In a control system as set forth in claim 8, said channel means being in fluid communication with said one port in all set positions of said selector means.

10. In a control system as set forth in claim 8, said channel means being of a size sufficient to bridge each pair of two adjacent ports of said certain ports when said selector means is set in a medial position between the respective predetermined set positions corresponding to the respective two adjacent ports.

11. In combination, a multi-step actuator means adapted to vary the operating function of a device in relationship to the stepped positoin of said actuator means, and a manually movable selector means adapted to actuate said actuator means to any one of said stepped positions thereof in relation to corresponding and predetermined set positions of said selector means, said selector means being so constructed and arranged that said selector means can be manually movable and infinitely settable between a first predetermined set positoin thereof and a last predetermined set position thereof and will be adapted to actuate said actuator means to an operating stepped position thereof in any manually set position of said selector means even though said selector means is set between adjacent predetermined set positions thereof.

12. A combination as set forth in claim 11 wherein said actuator means is adapted to be pneumatically operated, and wherein said selector means has means for interconnecting a pneumatic source to said actuator means in any set position of said selector means except at and adjacent said first predetermined set position thereof.

13. A combination as set forth in claim 11 wherein said selector means includes a reading head having a reading surface interrupted by a plurality of ports with certain of said ports being adapted to be interconnected to said actuator and with one of said ports being adapted to be interconnected to a pneumatic source, said selector means including a reading member movable relative to said reading surface and having means for fluidly interconnecting said one port to at least one of said certain ports at any set position of said selector means except at and adjacent first predetermined set position thereof.

14. A combination as set forth in claim 13 wherein said interconnecting means of said reading member includes a channel means in said reading member having its open side facing said reading surface.

15. A combination as set forth in claim 14 wherein said channel means is in fluid communication with said one port in all set positions of said selector means.

16. A combination as set forth in claim 14 wherein said channel means is of a size sufficient to bridge each pair of two adjacent ports of said certain ports when said selector means is set in a medial position between the respective predetermined set positions corresponding to the respective two adjacent ports.

17. A manually movable selector means adapted to actuate a multi-step actuator means to any one of its stepped positions thereof in relation to corresponding and predetermined set position of said selector means, said selector means being so constructed and arranged that said selector means can be manually movable and infinitely settable between a first predetermined set position thereof and a last predetermined set position thereof and can actuate said actuator means to an operating stepped position thereof in any manually set position of said selector means even though said selector means is set between adjacent predetermined set positions thereof.

18. A manually movable selector means as set forth in claim 17 wherein said selector means has means for interconnecting a pneumatic source to said actuator means in any set position of said selector means except at and adjacent said first predetermined set position thereof.

19. A manually movable selector means as set forth in claim 17 wherein said selector means includes a reading head having a reading surface interrupted by a plurality of ports with certain of said ports being adapted to be fluidly interconnected to said actuator means and with one of said ports being adapted to be interconnected to a pneumatic source, said selector means including a reading member movable relative to said reading surface and having means for fluidly interconnecting said one port to at least one of said certain ports at any set position of said selector means except at and adjacent said first predetermined set position thereof.

20. A manually movable selector means as set forth in claim 19 wherein said interconnecting means of said reading member includes a channel means in said reading member having its open side facing said reading surface.

21. A manually movable selector means as set forth in claim 20 wherein said channel means is in fluid communication with said one port in all set positions of said selector means.

22. A manually movable selector means as set forth in claim 20 wherein said channel means is of a size sufficient to bridge each pair of two adjacent ports of said certain ports when said selector means is set in a medial position between the respective predetermined set positions corresponding to the respective two adjacent ports.

23. A manually movable selector means as set forth in claim 20 wherein said channel means has a substantially triangular configuration with the area adjacent the apex thereof being superimposed over said one port in said reading surface in all settable positions of said reading member relative to said reading head.

24. A manually movable selector means as set forth in claim 20 wherein said channel means has a ring-like portion superimposed over said one port in said reading surface in all settable positions of said reading member relative to said reading head.

25. A manually movable selector means as set forth in claim 24 wherein said channel means has a substantially T-shaped portion with the leg thereof fluidly connected to said ring-like portion at the free end of said leg and with the cross member thereof being superimposed over at least one of said certain ports in any settable position of said reading member relative to said reading head except at and adjacent said first predetermined set position thereof.

References Cited
UNITED STATES PATENTS

| | | | |
|---|---|---|---|
| 3,043,328 | 7/1962 | Taylor | 68—12 X |
| 3,256,692 | 6/1966 | Rice et al. | 68—12 X |
| 3,318,116 | 5/1967 | Houser et al. | 68—12 |

WILLIAM I. PRICE, *Primary Examiner.*